Aug. 16, 1949.                T. VIGMOSTAD                2,479,436
                           WINDSHIELD MOUNTING
Filed Sept. 23, 1944                                2 Sheets-Sheet 1
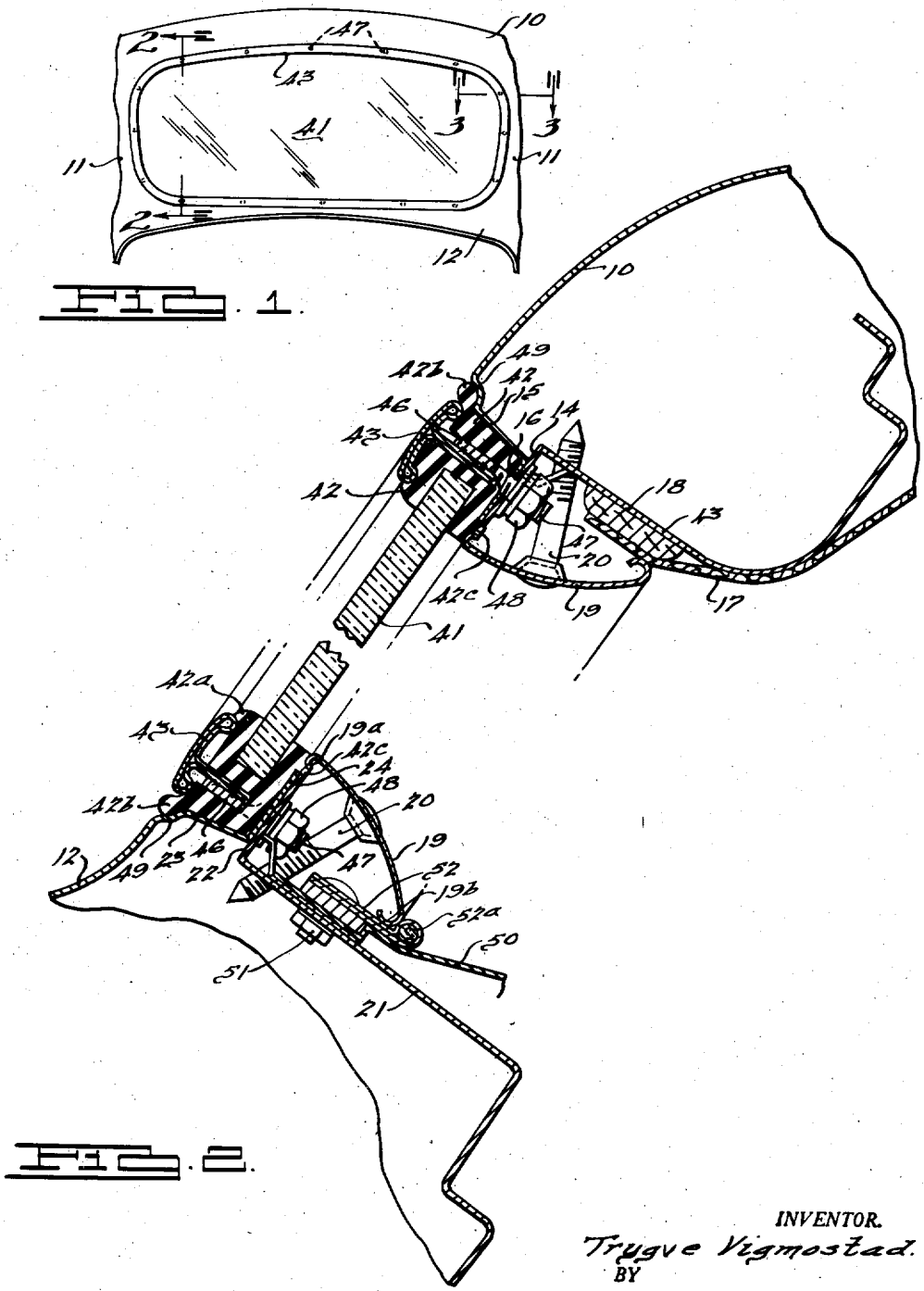
INVENTOR.
Trygve Vigmostad.
BY
Grayor Smith
ATTORNEYS.

Aug. 16, 1949.　　　　T. VIGMOSTAD　　　　2,479,436
WINDSHIELD MOUNTING
Filed Sept. 23, 1944　　　　　　　　　　　　2 Sheets-Sheet 2
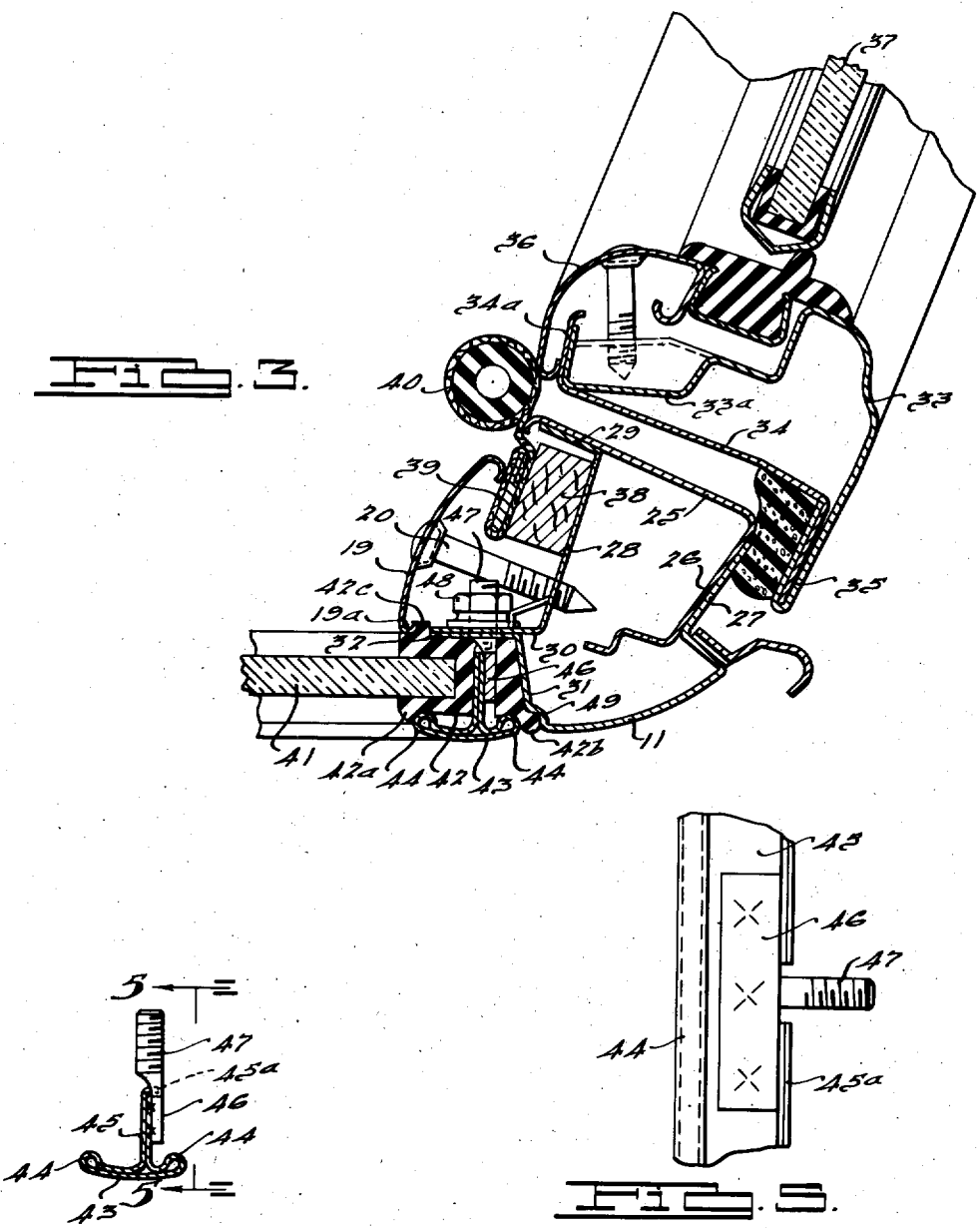
INVENTOR.
Trygve Vigmostad.
BY
George Smith
ATTORNEYS.

Patented Aug. 16, 1949

2,479,436

UNITED STATES PATENT OFFICE 2,479,436

WINDSHIELD MOUNTING

Trygve Vigmostad, Detroit, Mich., assignor to Briggs Manufacturing Company, Detroit, Mich., a corporation of Michigan Application September 23, 1944, Serial No. 555,416

2 Claims. (Cl. 296—84)

This invention relates generally to windows for vehicle bodies, such as the windshields thereof, and particularly to the construction, mounting and assembly of the windshield or other fixed window panel and associated parts of an automobile body.

An object of the invention is to provide an improved windshield or window panel mounting enabling the windshield or window panel to be installed as a unit from the outside of the body.

A further object of the invention is to provide improved and relatively simple means for mounting the windshield or transparent window panel on the body and by virtue of which the windshield glass or transparent panel may be assembled from the outside and secured in position by concealed fastening means accessible only at the inside of the body.

Another object of the invention is to provide an improved windshield or window structure in which the glass or transparent panel of the structure is mounted in a marginal frame preferably embodying a resilient or flexible sealing material, such as rubber, which may be readily and easily installed in a recess or seat formed on the outside of the body around the windshield or window opening and firmly secured in position by fastening devices accessible at the inside of the body.

Still another object of the invention is to provide a vehicle or automobile body windshield or window structure in which the glass or transparent panel is adapted to be assembled and removed at the outside of the body, effectively sealed against leakage or passage of air or water round the edges thereof, and held in position by means of a surrounding molding which is capable of being attached at the inside of the body to provide a theft-proof construction.

Other objects of this invention will appear in the following description and appended claims, reference being had to the accompanying drawings forming a part of this specification wherein like reference characters designate corresponding parts in the several views.

Fig. 1 is a fragmentary front elevation of a portion of an automobile body having a windshield structure embodying the present invention.

Fig. 2 is an enlarged fragmentary section taken substantially through lines 2—2 of Fig. 1 looking in the direction of the arrows.

Fig. 3 is an enlarged fragmentary section taken substantially through lines 3—3 of Fig. 1 looking in the direction of the arrows.

Fig. 4 is a section taken through the outside garnish molding by means of which the windshield attached to the body.

Fig. 5 is an enlarged fragmentary view taken substantially from lines 5—5 of Fig. 4 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is illustrated, by way of example, one embodiment of the invention as applied to the windshield structure of an automobile body. Although the invention is particularly useful in connection with the mounting of the windshield of a vehicle body, especially an automobile body, it will be understood that the invention may be adapted for application to other window structures of a vehicle body in which the window panel is stationary.

As illustrated in the drawings, especially Fig. 1, the automobile body is provided with a pressed metal roof panel 10 which extends forwardly and downwardly at its front end and is provided with a windshield opening. The panel 10 may have integral side panel portions 11 extending along opposite sides of the windshield opening and terminating in a forwardly extending cowl panel portion 12. The portions 11 and 12 may be formed integrally as parts of the roof panel 10 or may be in the form of a separate stamping or stampings butt-welded to the roof panel and finished along the welding lines to provide smooth joints.

The header of the windshield opening is formed by means of the roof panel 10 and a transverse pressed metal member 13, the latter having a marginal flange 14 directed inwardly toward the windshield opening. The roof panel 10 is pressed along the margin of the windshield opening to provide angularly related flange portions 15 and 16, the latter flange abutting against and extending face to face with the flange 14 of the header member 13. The juxtaposed flanges 14 and 16 are preferably spot-welded together and it will be seen that the flanging 15 and 16 of the roof panel forms a seat or recessed portion opening outwardly and forwardly. The fabric headlining for the interior of the body is indicated at 17 and its edge is attached to a tacking strip 18 secured to the header member 13. The attached edge of the headlining, as well as the attaching means for the windshield, hereinafter described, is concealed by means of a garnish molding 19 secured in place by means of screws 20, this molding preferably being in the form of a generally rectangular frame extending entirely around the inner edge of the windshield.

Immediately below the windshield opening the body is provided with a cross frame member 21 joining together the front body pillars and preferably formed as a stamping. This member 21 terminates at its upper edge in a flange 22 lying substantially in the plane of the flange 14 and extending inwardly toward the windshield opening. The cowl portion 12 along its upper edge is pressed rearwardly to provide a flange 23, similar to the flange 15, which terminates in an edge flange 24 extending substantially in the plane of the flange 16 and arranged in abutting relation to the flange 22. The juxtaposed flanges 22 and 24 are preferably spot-welded together.

Referring to Fig. 3, the construction of the side pillars or posts, which form the margins of the windshield opening along opposite sides thereof, is shown. Each upright pillar or post comprises a stamping 25 forming the jamb edge of the door and provided with an outwardly extending flange 26 extending in juxtaposed relation to a flange 27 formed on the side panel portion 11. Each pillar is of box-like construction and the inner side thereof is formed by means of a stamping 28 having a flange 29 spot-welded to the member 25 and also having a flange 30 extending inwardly toward the windshield opening and lying substantially in the plane of the flanging 14 and 22. Each of the side panel portions 11 are pressed to provide angularly related flanges 31 and 32 corresponding to the flanges 15, 16 and 23, 24 previously described. The terminal flange 32 of the side panel portion 11 extends in juxtaposed relation to the flange 30 and is spot-welded thereto.

From the foregoing construction it will be seen that the marginal edge of the windshield opening is formed with a recessed portion or seat extending continuously around the edge of the windshield opening and formed by means of the continuous flanging 15, 16, 23, 24, and 31, 32. This seat or recessed portion opens outwardly and forwardly and is constructed to receive the marginal edge of the windshield panel which is adapted to be assembled in position on the seat by installing it from the outside of the body.

The door of the automobile body may be of any suitable construction and in the present instance, as illustrated in Fig. 3, comprises an outer door panel 33 formed with the usual window opening and secured to an upright jamb member 34 to provide the usual overlap flange 35. As illustrated in Fig. 3, the outer panel of the door is pressed to provide the outer window reveal and is extended inwardly and suitably flanged for securement, as by spot-welding, to the inner flange 34a of the jamb member 34. The inner window reveal of the door is finished by means of a garnish molding 36. The usual sliding window glass, which may be shifted vertically in conventional manner, is shown at 37 in Fig. 3. Secured to the body pillar member 28 is a tacking strip 38. A fabric covered trim strip 39 is secured to the tacking strip and carries the usual windlace 40 adapted to be engaged by the inner edge of the door when closed. The garnish molding 19 when mounted in place has one flanged edge thereof engaging the trim strip 39, as indicated in Fig. 3.

The windshield comprises the usual glass or transparent panel 41 which is cut to generally rectangular shape with smoothly rounded corners. The marginal edge of this panel is embedded within a framing member 42 which extends continuously around the edge of the windshield panel. In the present instance the framing member 42 is formed of yieldable or resilient rubber or other plastic material. This framing member is shaped to fit snugly within the seat or recess formed in the body structure around the margin of the windshield opening by the flanging 15, 16, 23, 24, 31 and 32. Thus, the windshield panel 41 with its marginal frame 42 is adapted to be assembled as a unit from the outside of the body and seated against the back flanging 16, 24 and 32 of the marginal recess around the windshield opening.

The windshield is clamped in position within the marginal recess in the body structure by means of a finish molding 43 which is generally rectangular in shape to correspond to the contour of the edge of the windshield panel. As illustrated particularly in Figs. 4 and 5, the attaching molding 43 is pressed or rolled from sheet metal to provide an outer crowned portion terminating in bead-like edges 44, the metal at these edges being return bent and terminating in juxtaposed flanges 45 which may be spot-welded together. Thus, the molding 43 is substantially T-shaped in cross-section. Secured at intervals along the length of the flange portion 45 of the molding are attaching studs which are adapted to extend through the member 42. Each stud comprises a base piece 46 spot-welded to the flanging 45 of the molding and a projecting threaded shank 47 integrally or rigidly secured to the piece 46. This piece is seated against the out-turned edge 45a of the flanging 45, the stud 47 projecting through an aperture or cut-out portion in the flanged edge 45a, as illustrated in Fig. 5. Any suitable number of studs 47 may be provided on the molding 43, sixteen being provided in the present instance as indicated in Fig. 1.

After the windshield has been assembled and seated in the recessed portion around the edge of the windshield opening, the molding 43 is installed, as illustrated in the drawings, with the flanging 45 of the molding projecting into a slit in the framing member 42 and the studs 47 projecting therebeyond through holes in this member and in the back flanging or wall of the recess. After installation of the molding 43 with the threaded ends of the studs 47 accessible at the inside of the vehicle, the molding may be clamped tightly against the framing member 42 by means of nuts 48 threaded onto the ends of the studs. This operation will result in tightly clamping the windshield within the windshield opening and against the back wall 16, 24 and 32 of the marginal recess in the body structure around the edge of the windshield opening. After the nuts 48 have been tightened on the ends of the studs 47 the garnish molding 19 is fitted into position and attached by means of screws 20 to conceal the attaching means 47, 48 for the windshield.

The marginal framing 42, which is grooved to receive the edge of the windshield panel 41 and which is cemented thereto, has on its outer face a shallow recess or channel to receive the molding 43, the edges 44 of the molding abutting against the projecting edges 42a and 42b of this recess or channel. As a result of this construction the molding is securely seated against the outer face of the member 42 and is held against lateral displacement. The rounded or beaded edge 42b of the strip 42 is also adapted to seat within a groove 49 formed along the outer edge of the body paneling 10, 11 and 12, thus assisting in properly locating the windshield when installed. The marginal framing strip 42 for the windshield glass is also provided with a projecting rib 42c against which the turned edge 19a of the garnish molding 19 is adapted to seat.

As illustrated in Fig. 2, the front edge of th instrument panel 50 is secured by means of screws 51 to the cross-frame member 21. The garnish molding 19, when installed, has its inner turned edge 19b engaging a sealing strip 52 on the instrument panel, the joint between the garnish molding and panel being sealed by means of a windlace or cord 52a on the strip 52.

I claim:

1. In a vehicle body, a body structure formed with a window opening and recessed around the margin of said opening to provide a seat facing outwardly, a window panel having a border frame secured around and projecting laterally of the edge thereof, said frame being mounted on said seat by installing the window panel and frame from the outside of the body, a molding seated in a recess in the outer face of said frame and having studs projecting from the under side thereof through the frame and said seat, and devices for anchoring said studs at points located interiorly of the body.

2. In a vehicle body, a body structure formed with a windshield opening at the front of the body, said structure around the margin of the opening having a recess with the transverse back wall of the recess providing a seat, a windshield including a transparent panel having a sealing strip secured around the margin thereof and insertable into said opening from the outside of the body with said strip engaging said seat and confined within the recess, a molding engaging the outer face of said strip and having a series of permanently attached studs projecting through the strip and said seat, devices attachable to said studs at the inside of the body, and a garnish molding concealing said devices.

TRYGVE VIGMOSTAD.

REFERENCES CITED

The following references are of record in the file of this patent:

UNITED STATES PATENTS

| Number | Name | Date |
| --- | --- | --- |
| 2,070,676 | Northup | Feb. 16, 1937 |
| 2,204,769 | Potter | June 18, 1940 |
| 2,261,038 | Sherts | Oct. 28, 1941 |
| 2,449,875 | Cadwallader | Sept. 21, 1948 |